(12) United States Patent
Su et al.

(10) Patent No.: US 8,861,188 B2
(45) Date of Patent: Oct. 14, 2014

(54) DISPLAY MODULE SUPPORT FRAME FOR ELECTRONIC DEVICES AND METHOD OF MANUFACTURING SAME

(71) Applicant: Sinher Technology Inc., New Taipei (TW)

(72) Inventors: Ting-Hung Su, New Taipei (TW); Wen Yan Lin, New Taipei (TW); Yung-Chang Chiang, New Taipei (TW)

(73) Assignee: Sinher Technology Inc., New Taipei (TW)

( * ) Notice: Subject to any disclaimer, the term of this patent is extended or adjusted under 35 U.S.C. 154(b) by 183 days.

(21) Appl. No.: 13/666,639

(22) Filed: Nov. 1, 2012

(65) Prior Publication Data

US 2014/0118895 A1 May 1, 2014

(51) Int. Cl.
*G06F 1/16* (2006.01)

(52) U.S. Cl.
USPC .................. 361/679.21; 345/156; 455/575.1; 248/165

(58) Field of Classification Search
CPC ........................................................ G06F 1/00
USPC .......... 349/12, 43, 475, 58, 65, 139; 345/156, 345/168, 175, 473, 450, 214, 204, 211, 345/170; 361/679.09, 679.41, 679.27, 361/679.26, 679.4, 679.08, 679.01, 679.55, 361/679.58, 679.2, 679.02, 679.47, 679.34, 361/679.49, 679.3, 679.28, 679.31, 679.48; 455/575.7, 550.1, 575.1, 575.8, 457, 455/344, 411; 248/279.1, 339, 229.25, 165, 248/176.1, 188.8
See application file for complete search history.

(56) References Cited

U.S. PATENT DOCUMENTS

2010/0232100 A1* 9/2010 Fukuma et al. .......... 361/679.01
2012/0044620 A1* 2/2012 Song et al. ............... 361/679.01
2012/0264489 A1* 10/2012 Choi et al. .................... 455/566

FOREIGN PATENT DOCUMENTS

TW I319526 1/2010
TW M347583 12/2012

* cited by examiner

*Primary Examiner* — Hung Duong
(74) *Attorney, Agent, or Firm* — Muncy, Geissler, Olds & Lowe, P.C.

(57) ABSTRACT

A display module support frame for electronic devices includes a first support section, a second support section and a bend section located between the first and second support sections. The bend section includes a coupling zone and a bend buffer zone. The display module support frame has an initial state in which the first and second support sections do not receive forces and the first and second coupling portions of the first and second support sections are positioned at two sides of the coupling zone, and a bend state in which either the first or second support section receives the forces to bend a bridge portion such that the first and second coupling portions are moved towards the coupling zone to couple with each other, and the compression buffer space is shrunk to form a holding space between the first and second support sections to hold a display module.

12 Claims, 7 Drawing Sheets

DISPLAY MODULE SUPPORT FRAME FOR ELECTRONIC DEVICES AND METHOD OF MANUFACTURING SAME

FIELD OF THE INVENTION

The present invention relates to a display module support frame for electronic devices and method of manufacturing same and particularly to a support frame that provides a bend buffer space to facilitate punching and bending.

BACKGROUND OF THE INVENTION

Technology progress and development has spurred constant innovations of electronic devices such as notebook computers and cell phones. Aside from performance enhancement, their profiles also become thinner and more compact, and the weight is also lighter. Take a notebook computer as an example, in order to make the size smaller and weight lighter when being equipped with a display module (such as a screen) and a processing module (such as a motherboard), it generally adopts a design with a flip or slide cover.

A conventional flip electronic device has a support frame to hold the display module. One of the examples is disclosed in TW patent No. I319526 which has two sets of support ribs to couple with a display module. Another example is TW patent No. M347583 which has a hollow-out frame to form an installation space inside to hold a display module. As the support ribs are formed at a certain thickness, they make reducing the thickness of the electronic device difficult and cannot meet the prevailing demands. Hence the hollow-out frame becomes the mainstream implementation approach. The hollow-out frame generally is formed by punching a metal plate via a punch (or cutter) to produce a hollow-out zone on the metal plate. The display module can be held in the hollow-out zone. While such an approach can make the electronic device thinner, punching on the metal plate creates a lot of waste material that becomes a great concern.

To solve the problem of too much waste material, some producers have tried another fabrication approach of using a metal preform that is formed in a strip shape. By punching the metal preform multiple times, various support structures (such as a support deck) of a support frame are made. Finally, the support frame is bent to form an installation space to hold the display module. But directly bending the support frame results in bearing stresses by the bend portion when two ends of the support frame are pressed inwards. In the event that the bending force is applied inadvertently or the support frame cannot bear such the stresses due to its material, fracture could easily occur. Moreover, the bend portion which is forcibly pressed also is easily deformed due to the stresses that makes assembly of the display module in the following process difficult.

SUMMARY OF THE INVENTION

The primary object of the present invention is to provide a display module support frame that has a bend buffer zone to eliminate the stresses generated during punching operation.

To achieve the foregoing object, the present invention provides a display module support frame for electronic devices that includes a first support section, at least one second support section and a bend section between the first and second support sections. The first and second support sections have respectively a first coupling portion and a second coupling portion that correspond to each other. The bend section includes a coupling zone and a bend buffer zone formed between the first and second coupling portions. The bend buffer zone includes a bridge portion to bridge the first and second support sections and a compression buffer space formed among the first coupling portion, second coupling portion and bridge portion. The display module support frame has an initial state in which the first and second support sections do not receive forces and the first and second coupling portions are positioned at two sides of the coupling zone, and a bend state in which either the first or second support section receives the forces to bend the bridge portion such that the first and second coupling portions are moved towards the coupling zone to couple with each other, and the compression buffer space is shrunk to form a holding space between the first and second support sections to hold a display module.

In one embodiment the first coupling portion is extended towards the second coupling portion at a gradually tapered width.

In another embodiment the second coupling portion is extended towards the first coupling portion at a gradually tapered width.

In yet another embodiment the first coupling portion further includes a first coupling surface located at one side of the coupling zone, and a first compression surface located at one side of the bend buffer zone and connected to the first coupling surface at a first included angle. More specifically, the first coupling surface and first compression surface form the first included angle smaller than 180 degrees between them, and the first compression surface and the bridge portion form a second included angle smaller than 90 degrees between them.

In yet another embodiment the second coupling portion further includes a second coupling surface located at one side of the coupling zone, and a second compression surface located at one side of the bend buffer zone and connected to the second coupling surface at a third included angle. More specifically, the second coupling surface and second compression surface form the third included angle smaller than 180 degrees between them, and the second compression surface and the bridge portion form a fourth included angle smaller than 90 degrees between them.

In addition, the present invention provides a method of manufacturing a display module support frame for electronic devices that includes the steps as follows:

a) providing a metal punching preform to fabricate a display module support frame;

b) punching the display module support frame to form a bend section and a first support section and a second support section at two ends of the bend section; the first and second support sections including respectively a first coupling portion and a second coupling portion facing the bend section, the bend section including a coupling zone and a bend buffer zone formed between the first and second coupling portions, the bend buffer zone including a bridge portion to bridge the first and second support sections, and a compression buffer space formed among the first coupling portion, second coupling portion and bridge portion; and c) compressing and bending the display module support frame with either the first or second support section as a fulcrum so that the first coupling portion and second coupling portion are moved towards the coupling zone to couple with each other and the compression buffer space is shrunk to form a holding space between the first and second support sections to hold a display module.

In yet another embodiment the step of compressing and bending the display module support frame is followed by another step of soldering the first and second coupling surfaces to form secure bonding between them.

In yet another embodiment the step of soldering the first and second coupling surfaces is followed by yet another step of grinding and trimming the location where the first and second coupling surfaces are soldered and bonded to facilitate assembly of the display module.

The present invention, by forming a coupling zone and a bend buffer zone between the first and second coupling portions at the bend section allows the first and second coupling portions to be moved towards the coupling zone to couple with each other and shrink the compression buffer space while the display module support frame is bent upon receiving a force. Through the compression buffer space alleviating the stress generated during punching and bending of the first and second support sections, fracture of the display module support frame caused by inadvertent exerting of forces during the punching process or deficiency in material strength can be prevented. Moreover, the invention also provides a technique that can resolve the problem of generating too much waste material during fabrication of the display module support frame.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Please refer to FIGS. 1A, 1B, 2A and 2B, the present invention aims to provide a display module support frame 1 for electronic devices that can be formed by punching a metal punching preform for multiple times. It comprises a first support section 11, at least one second support section 12 located at one end of the first support section 11, and a bend section 13 between the first and second support sections 11 and 12. The first support section 11 and second support section 12 have respectively a first coupling portion 111 and a second coupling portion 121 corresponding to each other. The first coupling portion 111 is extended towards the second coupling portion 121 at a gradually tapered width and formed in a conical shape. The second coupling portion 121 also is extended towards the first coupling portion 111 at a gradually tapered width. More specifically, the first coupling portion 111 further includes a first coupling surface 112 and a first compression surface 113 connecting to the first coupling surface 112. The first coupling surface 112 and first compression surface 113 face the bend section 13 and form a first included angle d1 between them. The second coupling portion 121 includes a second coupling surface 122 and a second compression surface 123 connecting to the second coupling surface 122. The second coupling surface 122 and second compression surface 123 also face the bend section 13 and form a third included angle d2 between them. More specifically, the first included angle d1 and the third included angle d2 are respectively smaller than 180 degrees. The bend section 13 includes a coupling zone 131 and a bend buffer zone 132 formed between the first and second coupling portions 111 and 121. More specifically, the coupling zone 131 is formed between the first and second coupling surfaces 112 and 122. The bend buffer zone 132 includes a bridge portion 133 to bridge the first support section 11 and second support section 12, and a compression buffer space 134 formed among the first and second coupling portions 111 and 121, and the bridge portion 133. More specifically, the bend buffer zone 132 is interposed between the first and second compression surfaces 113 and 123, and the compression buffer space 134 is formed among the first and second compression surfaces 113 and 123, and the bridge portion 133. The first and second compression surfaces 113 and 123 oppose the bridge portion 133 to respectively form a second included angle d3 and a fourth included angle d4 that are smaller than 90 degrees.

The display module support frame 1 thus formed has an initial state and a bend state. At the initial state, the first and second support sections 11 and 12 do not receive forces and the first and second coupling portions 111 and 121 are located at two sides of the coupling zone 131, i.e., the first and second support sections 11 and 12 are not bent by external forces. At the bend state, the display module support frame 1 is bent by punching under the external forces to form a selected profile that can hold the display module. At the bend state, either the first or second support section 11 or 12 receives the forces to bend the bridge portion 133 so that the first coupling portion 111 and second coupling portion 121 are moved towards the coupling zone 131 to couple with each other and the compression buffer space 134 is shrunk to form a holding space A1 between the first and second support sections 11 and 12 to hold a display module. More specifically, at the bend state, the first and second compression surfaces 113 and 123 are moved towards the compression buffer space 134 so that the compression buffer space 134 becomes smaller until the first and second coupling surfaces 112 and 122 contact with each other.

Figure 1A:
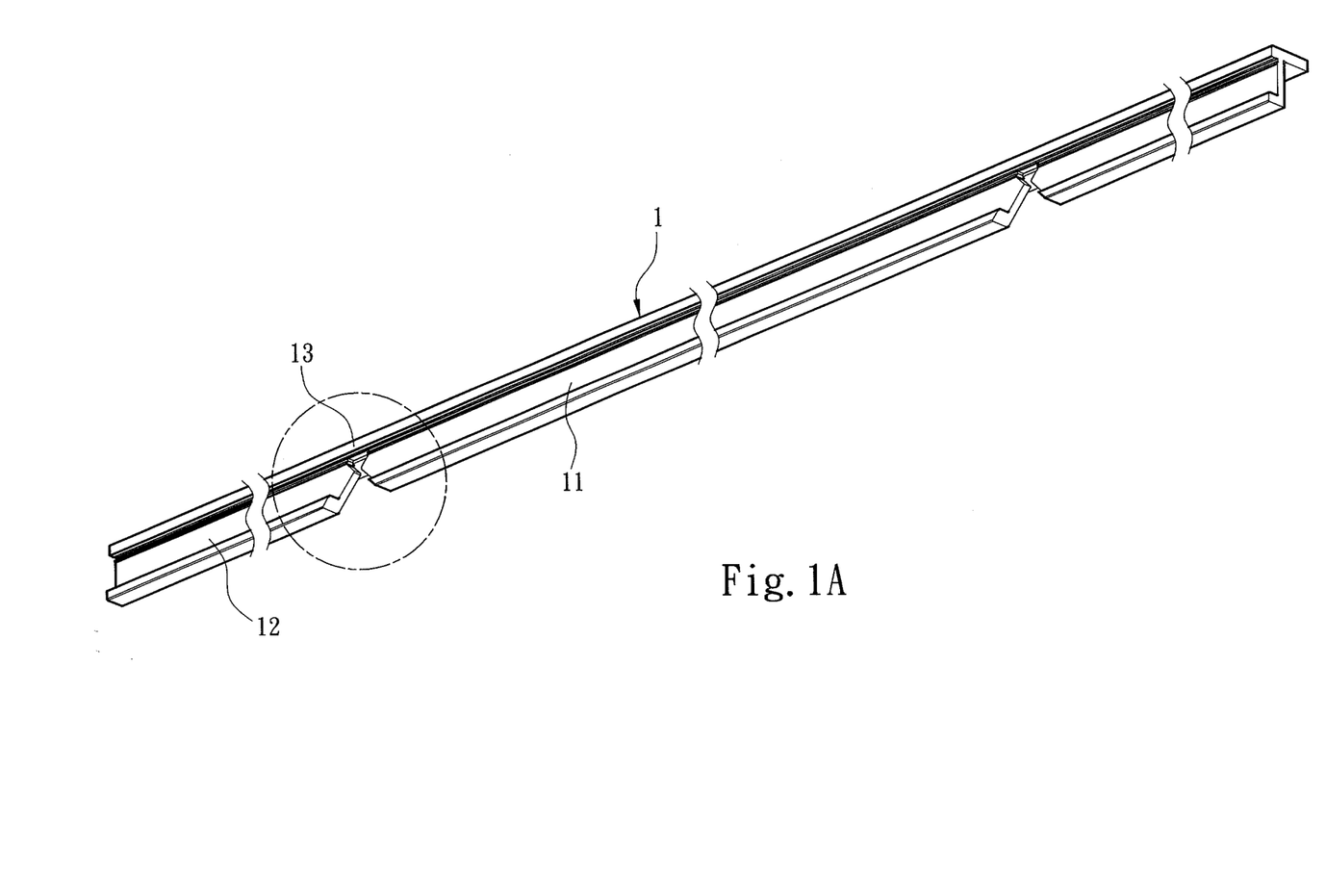
FIG. 1A is a perspective view of an embodiment of a display module support frame according to the invention at an initial state.
Figure 1B:
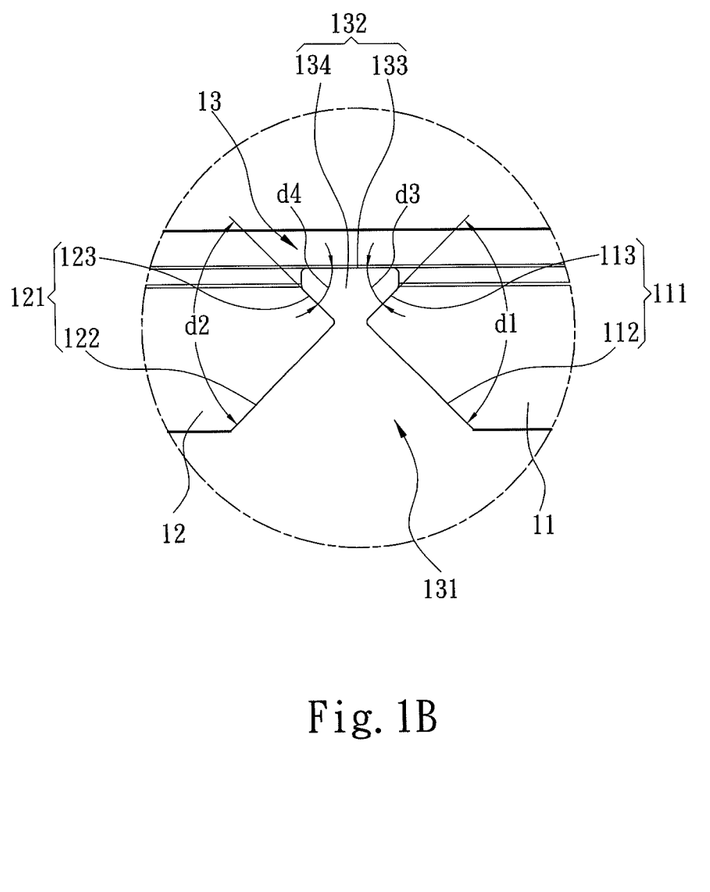
FIG. 1B is an enlarged front view of an embodiment of a display module support frame according to the invention at an initial state.
Figure 2A:
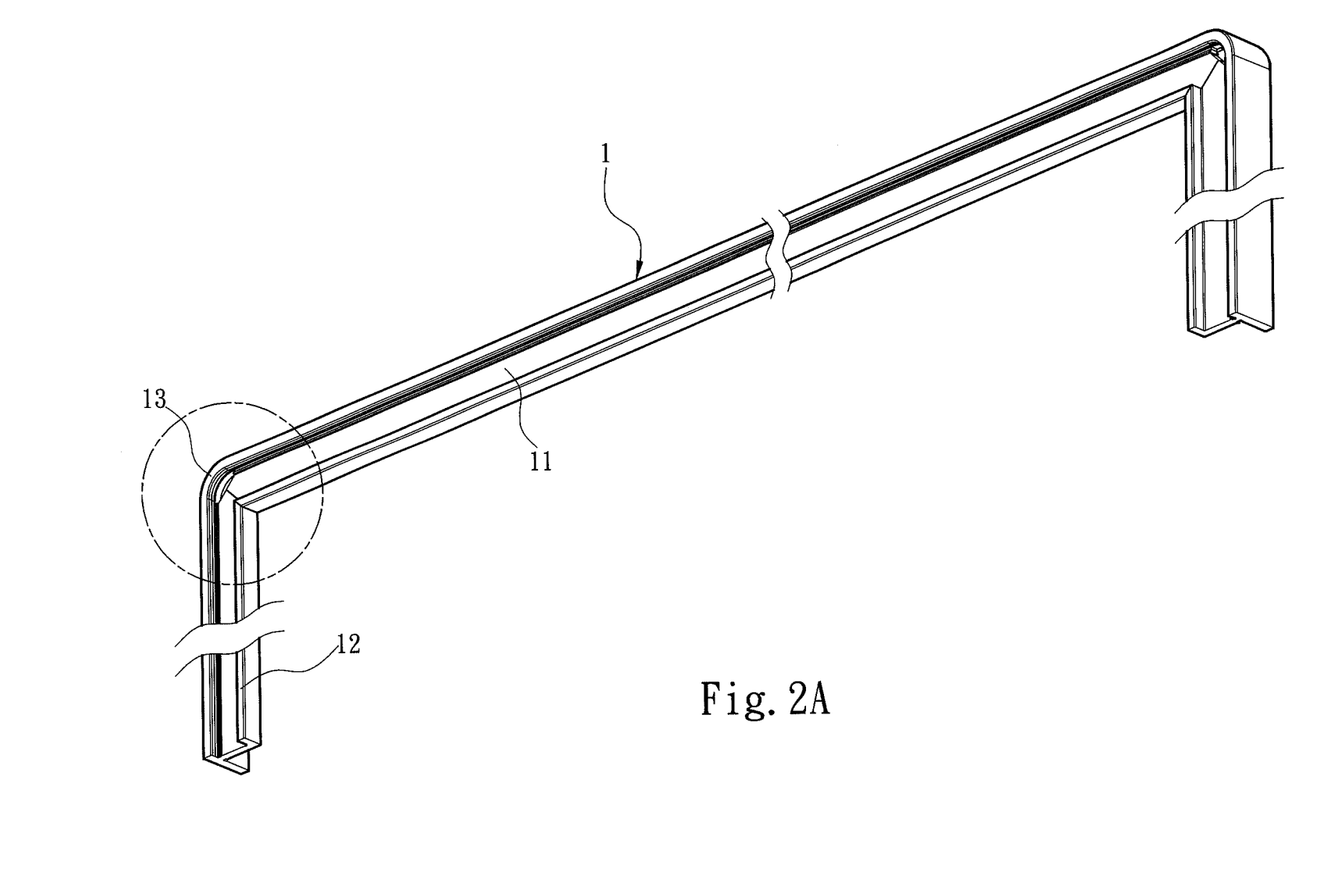
FIG. 2A is a perspective view of an embodiment of a display module support frame according to the invention at a bending state.
Figure 2B:
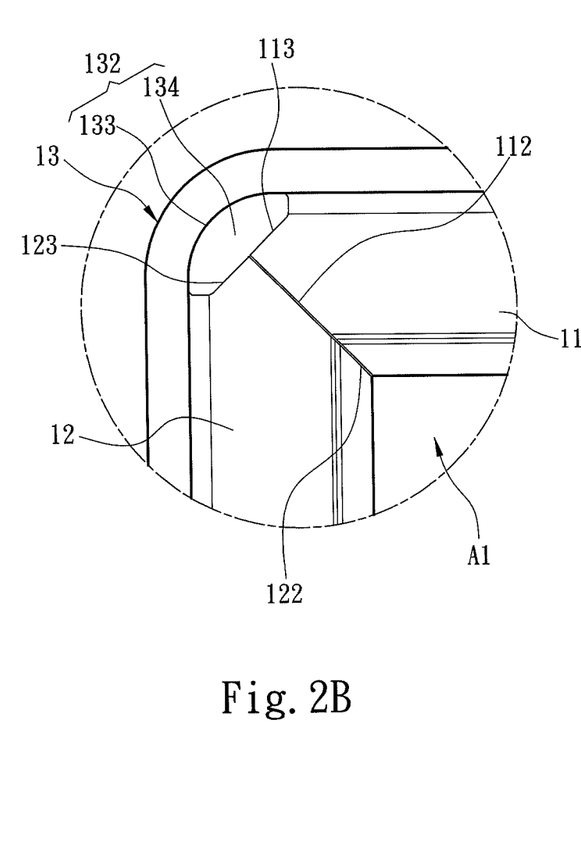
FIG. 2B is an enlarged front view of an embodiment of a display module support frame according to the invention at a bending state.
Figure 3:
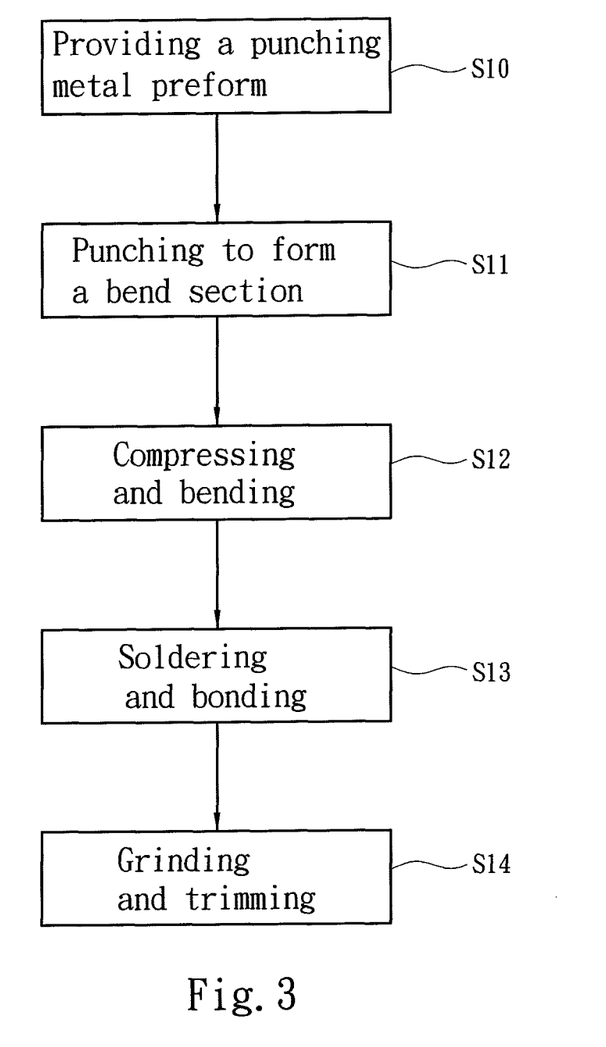
FIG. 3 is a flowchart of an embodiment of a method of manufacturing a display module support frame according to the invention.
Figure 4:
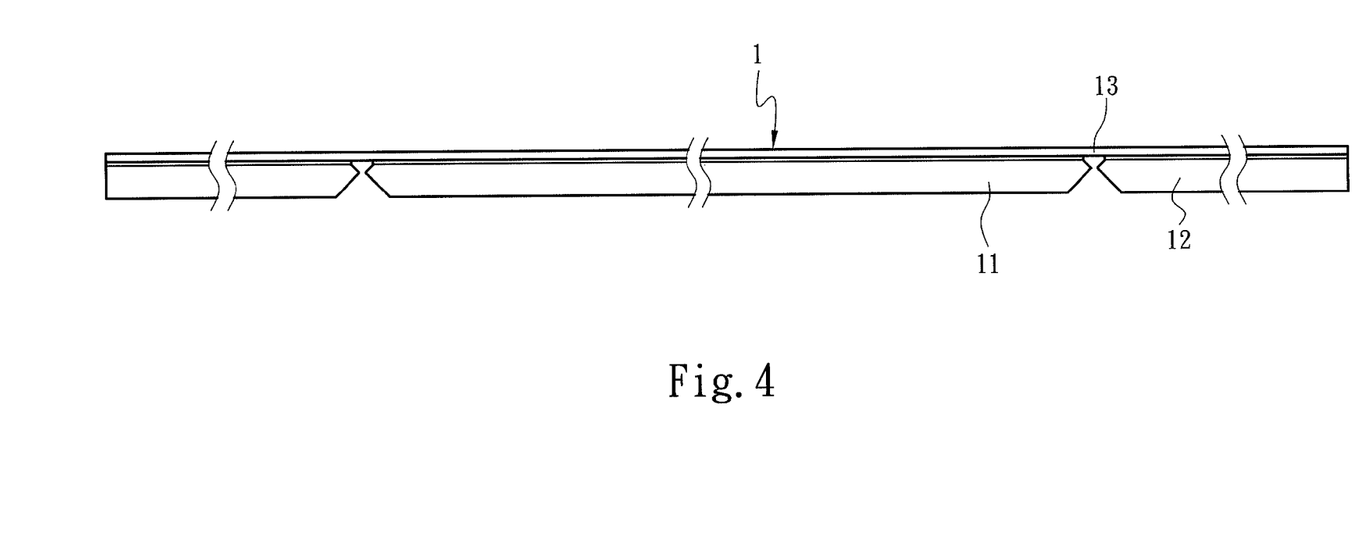
FIG. 4 is a schematic view of an embodiment of the method of manufacturing a display module support frame according to the invention at one process state.
Figure 5:
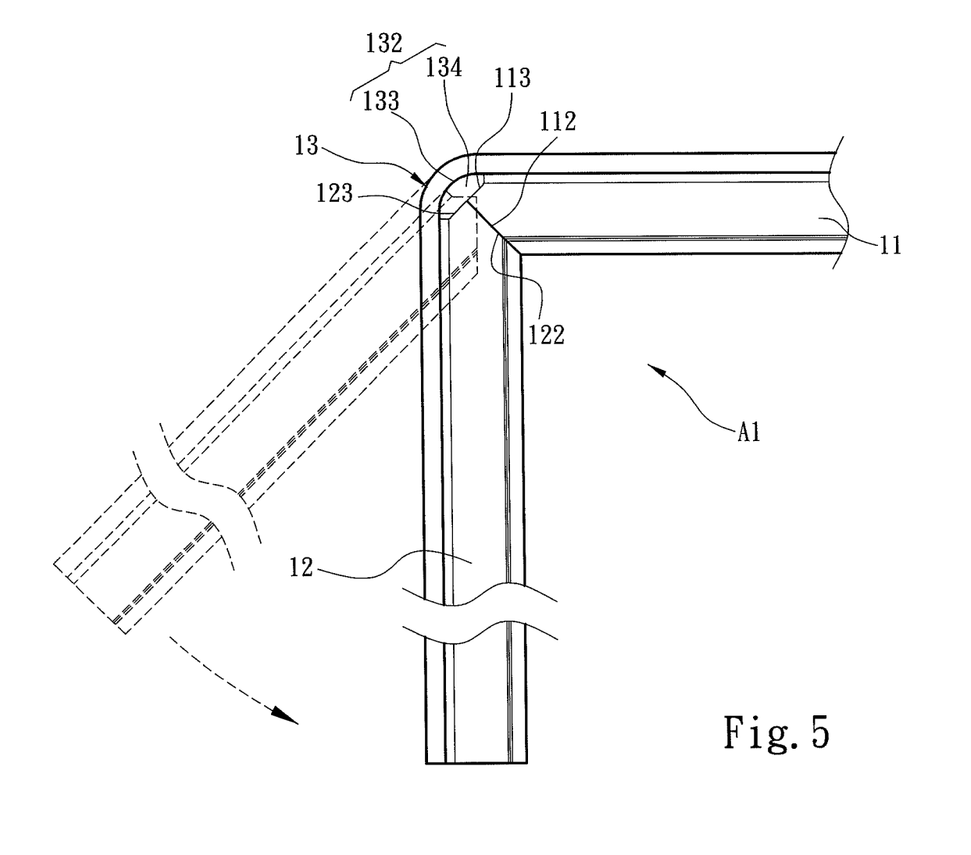
FIG. 5 is a schematic view of an embodiment of the method of manufacturing a display module support frame according to the invention at another process state.

Please refer to FIG. 3, the present invention also provides a method of manufacturing the display module support frame 1 for electronic devices, and also refer to FIGS. 1A and 1B. The method comprises the steps as follows:

Step S10: providing a metal punching preform to fabricate a display module support frame 1; the metal punching preform can be an elongate pillar;

Step S11: punching the display module support frame 1 to form a bend section 13, and a first support section 11 and a second support section 12 at two ends of the bend section 13; the first and second support sections 11 and 12 including respectively a first coupling portion 111 and a second coupling portion 121 facing the bend section 13; the bend section 13 including a coupling zone 131 and a bend buffer zone 132 formed between the first and second coupling portions 111 and 121; the bend buffer zone 132 including a bridge portion 133 to bridge the first and second support sections 11 and 12, and a compression buffer space 134 formed among the first coupling portion 111, second coupling portion 121 and bridge portion 133 (as shown in FIG. 4); and Step S12: compressing and bending the display module support frame 1 with either the first or second support section 11 or 12 as a fulcrum so that the first coupling portion 111 and second coupling portion 121 are moved towards the coupling zone 131 to couple with each other and the compression buffer space 134 is shrunk to form a holding space A1 between the first and second support sections 11 and 12 to hold a display module (as shown in FIG. 5).

In addition, the invention further includes a step S13 of securely bonding the first and second coupling surfaces 112 and 122 together by soldering after the step S12 of compressing and bending the display module support frame 1 has been performed, thereby the bent display module support frame 1 is fixed to provide enhanced support. Moreover, the step S13 of soldering and bonding the first and second coupling surfaces 112 and 122 also can be followed by another step S14 of grinding and trimming the location where the first and second coupling surfaces 112 and 122 are soldered and bonded to facilitate assembly of the display module, and also eliminate scratches or damages generated during assembly of the display module.

Figure 6:
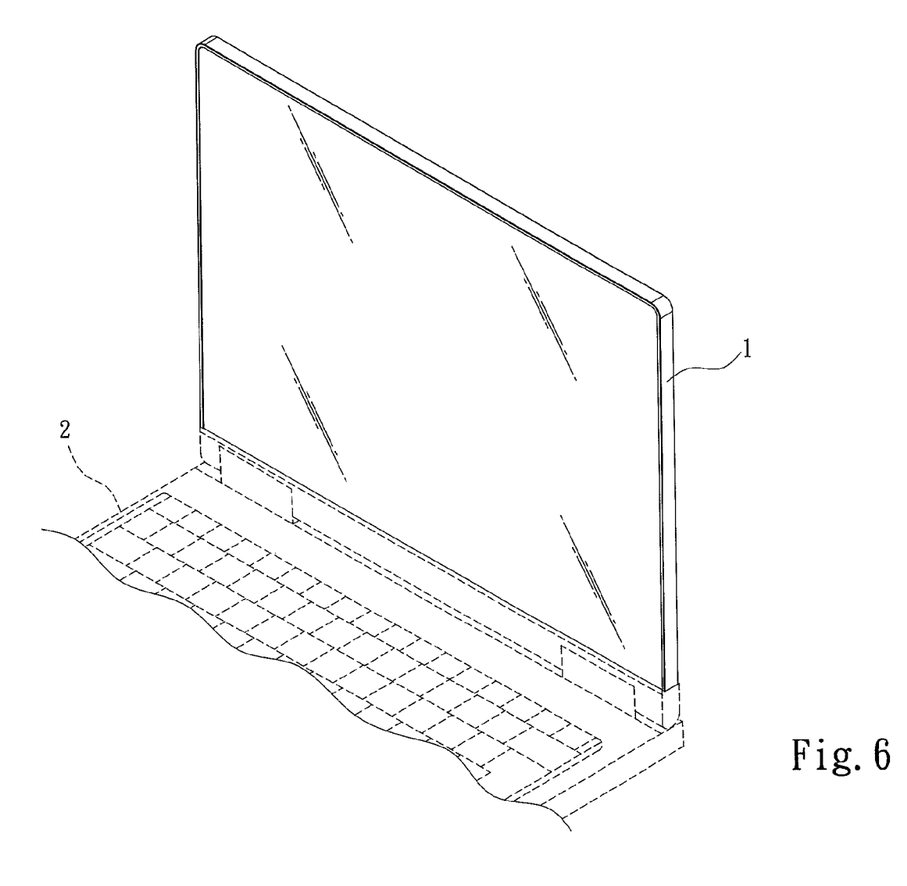
FIG. 6 is a schematic view of an embodiment of a display module support frame according to the invention used on an electronic device.

After fabrication of the display module support frame 1 is finished, it can be mounted on an electronic device 2 such as a notebook computer in an inverted U shape as shown in FIG. 6. The display module support frame 1 thus formed can make the electronic device thinner in size and lighter in weight than the conventional display module support frame.

As a conclusion, the display module support frame provided by the invention has a coupling zone and a bend buffer zone formed between the first and second coupling portions through the bend section. When the display module support frame is bent under forces, the first and second coupling portions are moved towards the coupling zone to couple with each other, and also the compression buffer space is shrunk. Through the compression buffer space, the stresses generated on the first and second support sections during punching and bending processes can be alleviated, hence fracture of the display module support frame caused by inadvertent applying of forces during the punching and bending processes or deficiency in material strength can be prevented, and the problem of producing excessive waste material occurring in the conventional processes of fabricating the display module support frame also can be resolved.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

LEGEND FOR FIG. 3

S10: Providing a punching metal preform
S11: Punching to form a bend section
S12: Compressing and bending
S13: Soldering and bonding
S14: Grinding and trimming

What is claimed is:

1. A display module support frame for electronic devices, comprising:
    a first support section and at least one second support section located at one end of the first support section that include respectively a first coupling portion and a second coupling portion corresponding to each other; and
    a bend section which is located between the first support section and the second support section and includes a coupling zone and a bend buffer zone formed between the first coupling portion and the second coupling portion, the bend buffer zone including a bridge portion to bridge the first support section and the second support section and a compression buffer space formed among the first coupling portion, the second coupling portion and the bridge portion;
    wherein the display module support frame includes an initial state in which the first support section and the second support section do not receive forces and the first coupling portion and the second coupling portion are located at two sides of the coupling zone, and a bend state in which either the first support section or the second support section receives the forces to bend the bridge portion such that the first coupling portion and the second coupling portion are moved towards the coupling zone to couple with each other and the compression buffer space is shrunk to form a holding space between the first support section and the second support section to hold a display module.

2. The display module support frame of claim 1, wherein the first coupling portion is extended towards the second coupling portion at a gradually tapered width.

3. The display module support frame of claim 1, wherein the second coupling portion is extended towards the first coupling portion at a gradually tapered width.

4. The display module support frame of claim 1, wherein the first coupling portion further includes a first coupling surface located at one side of the coupling zone and a first compression surface located at one side of the bend buffer zone and connected to the first coupling surface to form a first included angle therebetween.

5. The display module support frame of claim 4, wherein the first included angle between the first coupling surface and the first compression surface is smaller than 180 degrees.

6. The display module support frame of claim 4, wherein the first compression surface and the bridge portion form a second included angle therebetween smaller than 90 degrees.

7. The display module support frame of claim 1, wherein the second coupling portion further includes a second coupling surface located at one side of the coupling zone and a second compression surface located at one side of the bend buffer zone and connected to the second coupling surface to form a third included angle therebetween.

8. The display module support frame of claim 7, wherein the third included angle between the second coupling surface and the second compression surface is smaller than 180 degrees.

9. The display module support frame of claim 7, wherein the second compression surface and the bridge portion form a fourth included angle therebetween smaller than 90 degrees.

10. A method of manufacturing a display module support frame for electronic devices, comprising the steps of:
    providing a metal punching preform to fabricate a display module support frame;
    punching the display module support frame to form a bend section and a first support section and a second support section at two ends of the bend section; the first and second support sections including respectively a first coupling portion and a second coupling portion facing the bend section, the bend section including a coupling zone and a bend buffer zone formed between the first and second coupling portions, the bend buffer zone including a bridge portion to bridge the first and second support sections and a compression buffer space formed among the first coupling portion, the second coupling portion and the bridge portion; and compressing and bending the display module support frame via either the first support section or the second support section as a fulcrum such that the first coupling portion and the second coupling portion are moved towards the coupling zone to couple with each other and the compression buffer space is shrunk to form a holding space between the first and second support sections to hold a display module.

11. The method of claim 10 further including a step of securely bonding a first coupling surface of the first coupling portion and a second coupling surface of the second coupling portion together via soldering that is performed after the display module support frame has been compressed and bent.

12. The method of claim 11 further including a step of grinding and trimming the location where the first and second coupling surfaces are soldered and bonded to facilitate assembly of the display module that is performed after the first and second coupling surfaces have been securely bonded.

* * * * *